(No Model.)
J. H. THOMAS.
FLOUR BIN AND SIFTER.
No. 403,974. Patented May 28, 1889.
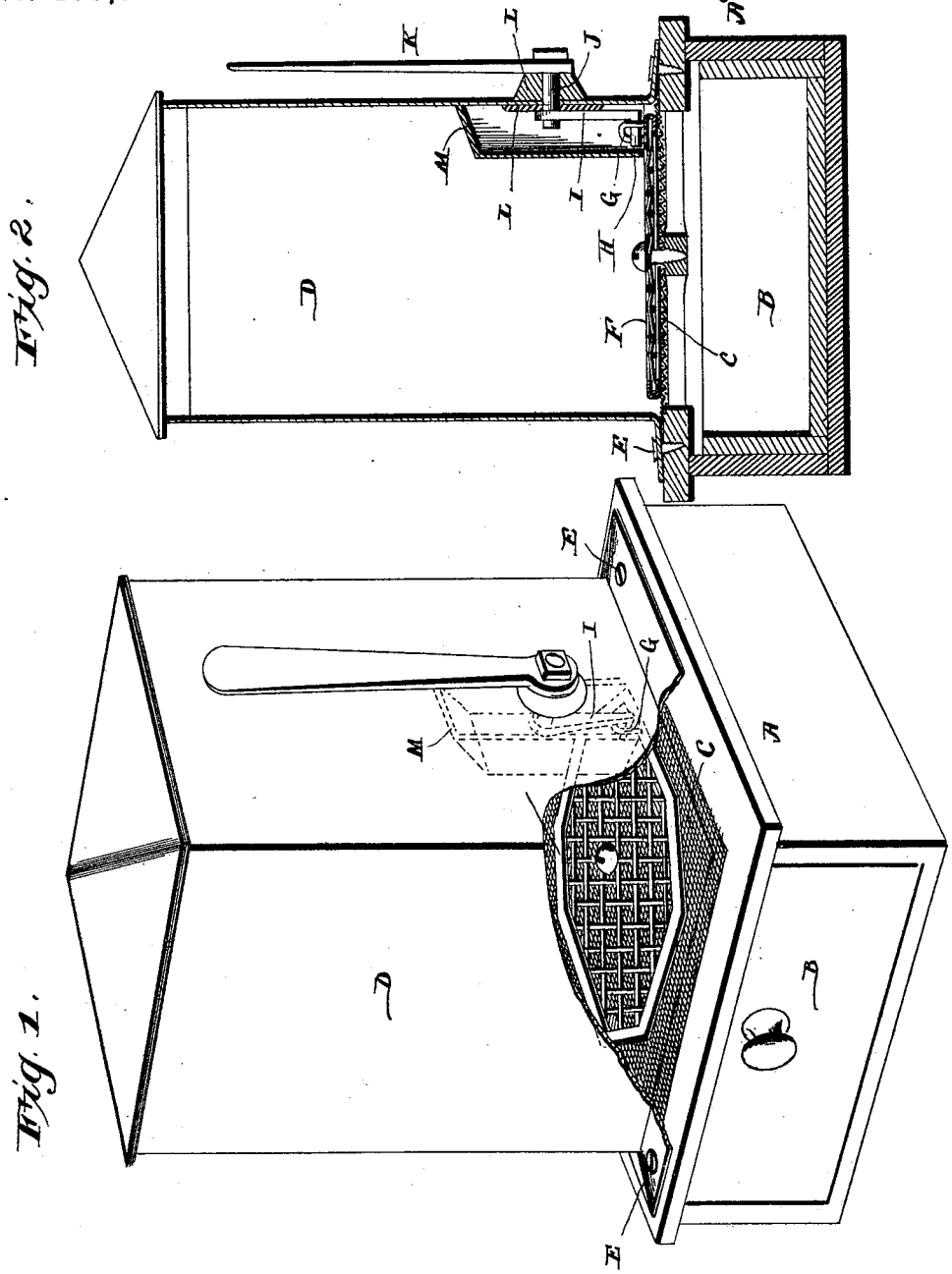
Witnesses,
Inventor,
Joseph H. Thomas
By his Attorney

UNITED STATES PATENT OFFICE.

JOSEPH H. THOMAS, OF ALLIANCE, OHIO.

FLOUR BIN AND SIFTER.

SPECIFICATION forming part of Letters Patent No. 403,974, dated May 28, 1889.

Application filed January 31, 1889. Serial No. 298,213. (No model.)

*To all whom it may concern:*

Be it known that I, JOSEPH H. THOMAS, a citizen of the United States, residing at Alliance, in the county of Stark and State of Ohio, have invented new and useful Improvements in Flour Bins and Sifters, of which the following is a specification.

My invention relates to improvements in flour bins and sifters; and it consists in certain novel features hereinafter described and claimed.

In the accompanying drawings, Figure 1 is a perspective view with part of the casing broken away. Fig. 2 is a vertical section.

Referring to the drawings by letter, A designates the base or lower compartment of my improved device, having a drawer, B, adapted to receive the sifted flour, and provided in its top or upper side with a screen, C.

D designates the upper compartment of my improved bin, which is removably secured upon the base or lower compartment by the screws E, as shown. The upper compartment has an open lower end, in which is arranged the agitator or sifting-screen F, which is pivoted at its center to the center of the screen C, forming the top of the lower compartment, as shown. This agitator F is somewhat smaller than the bottom of the compartment D, so that it can vibrate easily therein. On its upper side, at its edge, the said agitator is provided with the vertical loop G, which is engaged by the pin H at the lower end of a crank-arm, I, depending from the rock-shaft J, journaled in the side of the compartment D. This rock-shaft is extended beyond one side of the compartment, and is provided at its end with an operating-lever, K. The shaft is prevented from moving longitudinally in its bearing, and also prevented from vibrating therein by the washers L L, which are secured on the shaft and bear against the opposite sides of the wall of the upper compartment. Within the compartment D, I secure the guard or cap M, which extends over the crank-arm I and the inner end of the shaft, so as to prevent the flour accumulating around the said parts and clogging the action of the same.

In practice the flour is stored in the upper compartment of the bin and is supported by the screened bottom of the same, so that it will easily pass into the drawer B when so desired. When it is desired to use the flour, the operating-lever is vibrated, consequently rotating the rock-shaft and vibrating the crank-arm I. The motion of the crank-arm I will be communicated directly to the agitator through the loop G and pin H, so that the agitator will be oscillated in a horizontal plane, consequently stirring up the flour and forcing it through the screened top of the lower compartment. The screened top of the lower compartment is of rather fine mesh, while the agitator has a coarser and larger mesh, to allow the flour to fall easily therethrough onto the screened top of the base. The agitator bears directly on the upper surface of the screen-top, so that when it is oscillated the flour will be forced through the said screened top into the drawer B.

From the foregoing description, taken in connection with the accompanying drawings, it will be seen that I have provided a very efficient flour bin or sifter, which is composed of few parts and is compactly arranged.

Having thus described my invention, what I claim, and desire to secure by Letters Patent, is—

1. The combination of the base or lower compartment having a screen-top, the upper compartment removably secured on the base, the agitating-screen centrally pivoted on the upper side of the screen-top, and a driving-shaft mounted horizontally in the side of the upper compartment and connected with the agitator, as set forth.

2. The combination of the base having a screen-top, the compartment D, secured on the base, the horizontal agitator pivoted on the upper side of the screen-top and having a vertical loop, G, on its upper side, the horizontal rock-shaft journaled in the side of the compartment and having an operating-lever at its outer end, and a crank-arm depending from the inner end of the said shaft and provided with a horizontal pin at its lower end engaging the loop G, as set forth.

3. The combination of the compartment D, the rock-shaft journaled in the side of the compartment and having an operating-lever on its outer end, the horizontal agitator, the crank-arm on the rock-shaft connected with the agitator, and the cap secured within the compartment and extending over the end of the rock-shaft and the crank-arm, as set forth.

In testimony that I claim the foregoing as my own I have hereto affixed my signature in presence of two witnesses.

JOSEPH H. THOMAS.

Witnesses:
JAS. W. CENTEN,
J. L. PHILIPS.